United States Patent Office 3,270,523
Patented Sept. 6, 1966

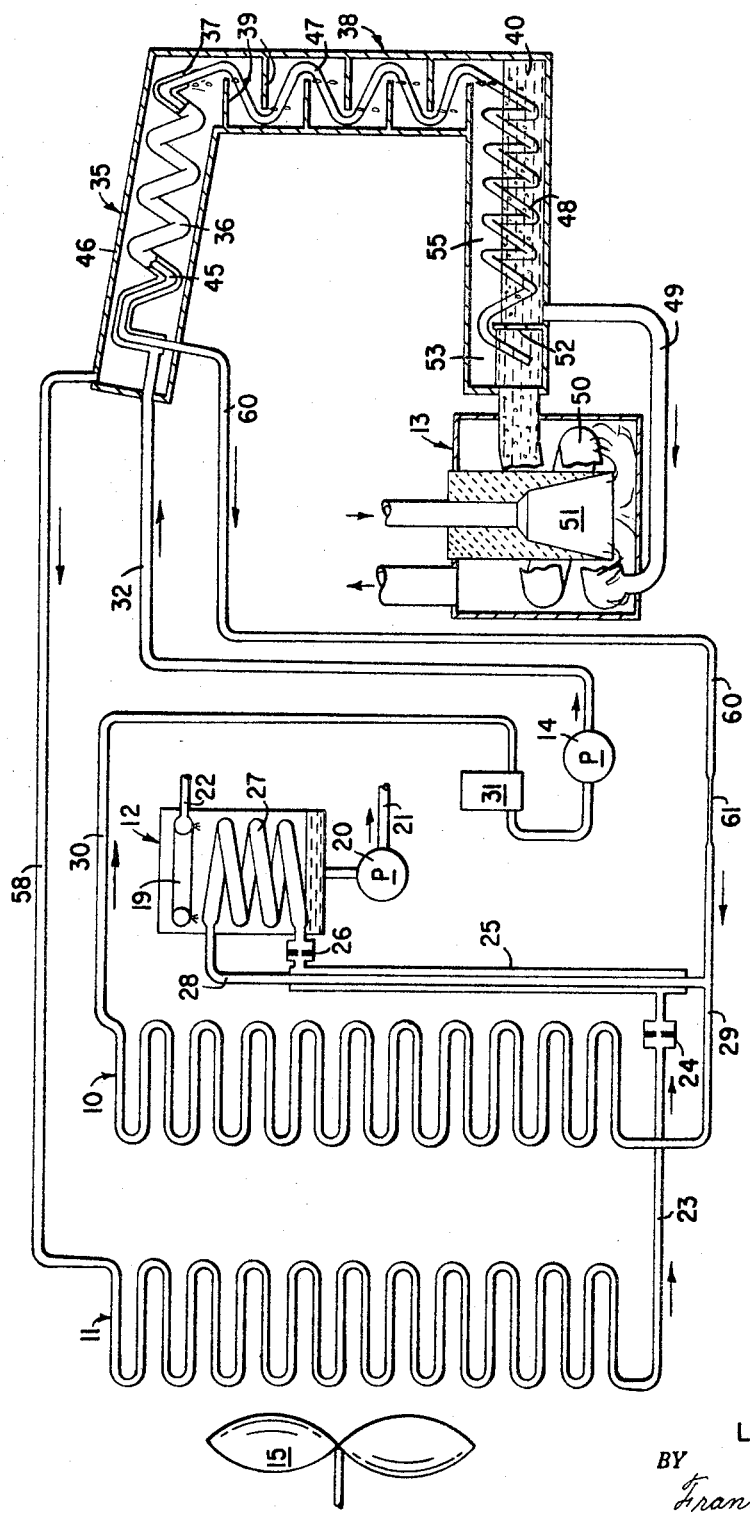

3,270,523
SOLUTION HEAT EXCHANGER ARRANGEMENT
FOR ABSORPTION REFRIGERATION SYSTEM
Lowell A. McNeely, Indianapolis, Ind., assignor to Carrier Corporation, Syracuse, N.Y., a corporation of Delaware
Filed Mar. 30, 1965, Ser. No. 443,805
1 Claim. (Cl. 62—495)

This invention relates to absorption refrigeration and, more particularly, to absorption refrigeration systems of the type employing an analyzer to enrich the refrigerant content of vapor passing from the evaporator to the condenser.

In prior absorption refrigeration systems it has been frequent practice to employ an analyzer column for passing vapor from the generator to the condenser in mass and heat transfer relation with weak absorbent solution passing from the absorber to the generator. The use of an analyzer greatly enriches the refrigerant content of the vapor and results in an over-all increase in thermodynamic efficiency of the refrigeration cycle.

It has also been prior practice to employ a rectifier to further enrich the refrigerant content of the vapor leaving the evaporator by condensing absorbent therefrom. Condensate formed in the refrigerant may be advantageously introduced into the analyzer column to generate additional refrigerant vapor by mass and heat transfer with the vapor in the analyzer.

Such prior systems have been effective but have not taken entire advantage of the potential thermodynamic efficiency which can be realized by a refrigeration system utilizing this invention. Furthermore, such prior systems have frequently required various solution splitting schemes in order to introduce the right quantities of solution at the proper location in the analyzer column and elsewhere in the refrigeration cycle. These schemes have resulted in undesirably complex mechanical arrangements and solution piping. For this reason, optimizing the solution flows in the refrigeration cycle, often could not be economically justified in view of the excessive cost of the optimum physical arrangement. Furthermore, prior refrigeration cycles have frequently required excessive heat exchange surface which further added to the cost of the refrigeration machine.

It is therefore a principal object of this invention to provide an improved absorption refrigeration system.

It is a further object of this invention to provide an improved absorption refrigeration system having a high thermodynamic efficiency while at the same time minimizing the complexity and the heat transfer surface requirements of the system.

These and other objects of this invention are achieved in the illustrated preferred embodiment thereof which includes an absorption refrigeration system having an evaporator for evaporating refrigerant and providing a cooling effect, a generator for concentrating weak absorbent solution by vaporizing refrigerant therefrom, a condenser for condensing refrigerant vapor in said generator, and a rectifier and analyzer for enriching the refrigerant content of the vapor passing from the generator to the condenser. An analyzer column is provided having passage means for passing vapor upwardly through the column in counterflow with weak absorbent solution passing downwardly through the column to effect a mass and heat transfer therebetween. Condensate formed in the rectifier is discharged into the top of the analyzer column and passes downwardly therethrough along with the weak absorbent solution.

Strong solution from the generator is first passed through a generator reservoir where it is partially cooled and is then passed upwardly through a heat exchanger located in the analyzer column, concurrently with the direction of flow of the refrigerant vapor. The strong solution passes in heat exchange relation with both the rectifier condensate and the weak solution passing downwardly through the analyzer as well as with the vapor passing upwardly through the analyzer. The surface of the heat exchanger is wetted with both weak solution and rectifier condensate and the heat exchanger therefore provides surface for mass and heat transfer to take place with the vapor passing upwardly through the analyzer.

In the preferred system the entire flow of solution passes through the rectifier to the analyzer and through the analyzer to the generator without being split along the way. Furthermore, the entire flow of vapor in the system is from the generator toward the condenser and the entire flow of strong solution from the generator to the analyzer is concurrent with the flow of vapor through the analyzer and rectifier. This results in an optimum cycle efficiency with minimum heat transfer surface being required. Since no solution or vapor splitting is required, the mechanical complexity of the system is reduced to a minimum resulting in desirably low manufacturing costs and machine reliability.

These and other objects of this invention will become more readily apparent by reference to the following specification and attached drawing wherein the figure is a schematic flow diagram of an absorption refrigeration system illustrating a preferred embodiment of this invention.

Referring to the drawing there is shown an absorption refrigeration system having an absorber 10, a condenser 11, and evaporator 12, and a generator 13 connected to provide refrigeration.

A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred to as an "absorbent solution" although it will be appreciated that pure water is not technically a solution.

A chilled water pump 20 is provided for forwarding water, or other heat exchange medium chilled in evaporator 12, through chilled water line 21 to a suitable remote location for chilling a refrigeration load. The water is then returned through chilled water line 22 to a spray header 19 from which it is distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior of the evaporator coil. The refrigerant vapor passes from coil 27 through vapor line 28, the interior passage of liquid suction heat exchanger 25, to mixing line 29 where it is mixed with strong solution returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorber coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35, in the preferred embodiment of this invention, comprises an outer shell 46 forming a vapor passage. Shell 46 contains an inner heat exchange coil 45 and a concentric outer heat exchange coil 36, as shown in the drawing. Preferably outer heat exchange coil 36 is spirally disposed along the inner wall of shell 46 and it may be provided with suitable fins for enhancing heat transfer.

Coils 36 and 45 form a solution heat exchanger between the entire quantity of relatively hot strong solution passing from the generator to the absorber and the entire quantity of relatively cool weak solution passing from the absorber to the generator. The amount of heat transfer surface provided between the strong and weak solution is designed so that the weak solution is brought to just about its boiling point so that vapor is not formed in the solution heat exchanger. Formation of vapor in the solution heat exchanger is undesirable because it results in flow of vapor in the solution circuit in a direction opposite that which provides best thermodynamic efficiency with minimum heat transfer surface. In accordance with this invention, heat from the strong solution is utilized to boil weak solution in the generator reservoir, rather than in the heat exchanger, which is a thermodynamically more advantageous location and results in a flow of vapor through the analyzer and rectifier concurrently with the strong solution. The weak solution from line 32 passes through coil 36 in the annular space between inner heat exchange coil 45 and outer heat exchange coil 36 where the weak solution is heated to substantially its boiling point by heat exchange with strong solution.

After passing through coil 36 the heated weak solution is discharged from opening 37 onto one of a plurality of baffles or plates 39 in analyzer column 38. Analyzer 38 comprises a hollow vertically disposed tubular shell member having a plurality of horizontally extending plates 39 disposed along the vertical axis thereof. Plates 39 extend from alternately opposite sides of analyzer 38 partially across the vapor passage formed by the analyzer to provide a serpentine path for vapor to pass through the analyzer. A heat exchanger 47, preferably comprising a helical coil, is disposed within analyzer 38 in the spaces between plates 39. By making heat exchanger 47 helical and of the proper pitch, the coil can be threaded through the analyzer section or the analyzer can be segmental and assembled around the coil. Plates 39 distribute liquid over the surface of the helical coil of heat exchanger 47 to wet the surface thereof. Analyzer 38 includes passage means to pass vapor formed in generator 13, into the analyzer from reservoir 40 and means to discharge vapor from the analyzer into rectifier 35. Analyzer 38 also includes passage means to pass rectifier condensate and weak solution from the rectifier into the analyzer. It will be understood, however, that as shown in the drawing, the same passage will suffice for passing vapor to the rectifier and condensate and weak solution from the rectifier to the analyzer so as to simplify the construction. The weak solution passes successively over the plurality of plates and is discharged from the bottom of the analyzer into generator reservoir 40. Generator reservoir 40 provides solution storage for part load operation conditions and allows for solution and refrigerant charging tolerance, and compensates for manufacturing variations in machine volume.

Preferably, rectifier-heat exchanger section 35, analyzer 38, and generator reservoir 40 are formed into a single vessel for ease of manufacturing and to eliminate piping costs. It will be appreciated, however, that the portions of this vessel may be separated, if desired, and need not necessarily be located in the positions relative to one another shown in the drawing.

Weak solution from generator reservoir 40 passes through line 49 into generator coil 50. The solution in coil 50 is heated by suitable means such as gas burner 51 causing the solution to boil, thereby forming vapor. The vapor and hot solution is discharged from coil 50 into separation chamber 53 formed by a baffle or weir 52 where the vapor separates from the remaining strong solution. Preferably, some of the solution normally spills over the top of baffle 52 and is recirculated through line 49 to generator coil 50. It will be understood that the solution in separation chamber 53 has been concentrated by vaporizing refrigerant therefrom in generator 13.

Vapor formed in generator 13 passes concurrently with strong solution through the vapor passage 55 formed in the upper portion of generator reservoir 40, through analyzer 38, and through the vapor passage formed by shell 46 of rectifier 35 to condenser 11.

The concentrated or strong absorbent solution from separation region 53 is at the relatively high generator pressure and passes through heat exchange coil 48 in generator reservoir 40, heat exchange coil 47 in the analyzer column, and inner heat exchange coil 45 in the rectifier. The strong solution then passes through line 60 and restriction 61 into line 29 and absorber 10 on the relatively low pressure side of the system.

Heat from the strong solution passing through coil 48 boils the weak solution in the generator reservoir to vaporize refrigerant therefrom. The heat exchange which takes place in the generator reservoir results in cooling the strong solution flowing through coil 48 so that it enters the analyzer and rectifier respectively at the best temperature to achieve maximum efficiency with minimum heat transfer surface. It is undesirable to form vapor in the solution heat exchanger but forming vapor in the generator reservoir results in a significant improvement in the over-all efficiency. Thus, heat which could not be effectively utilized in the heat exchanger is utilized to boil refrigerant from solution in the reservoir.

A portion of coil 48 is submerged below the level of weak solution in reservoir 40 and another portion of the coil is disposed in the vapor passage above the weak solution. The boiling of the weak solution causes the portion of coil 48 which is disposed in the vapor passage 55 to be wetted with solution. As the strong solution passes through the coil 48, it becomes progressively cooler. Vapor formed in the generator and in the reservoir passes through the vapor passage 55 and contacts the exposed wetted portion of coil 48 in reservoir 40, and mass and heat transfer takes place with the weak solution boiling in the reservoir. It will be appreciated that ammonia vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution. The vapor, somewhat enriched in refrigerant content, passes from reservoir 40 into analyzer 38.

The vapor passes upwardly through the serpentine vapor passage formed by plates 39 in the analyzer column. As the vapor passes upwardly, it is in heat and mass transfer relation with the liquid solution which wets the surfaces of plates 39. As will be seen from the drawing, the liquid passes downwardly as it spills from the staggered plates in the analyzer column. Plates 39 provide extended surface within the analyzer to assist the heat and mass transfer.

In accordance with this invention, the weak solution and rectifier condensate are also in heat transfer relation with the strong solution flowing through heat exchanger 47. The weak solution and rectifier condensate, which are relatively rich in refrigerant, are distributed by plates 39 over the surface of heat exchanger 47. The resulting heat exchange causes refrigerant to vaporize from the condensate and weak solution. This vapor passes upwardly through the analyzer column into the rectifier along with vapor formed in the generator and the generator reservoir.

It will be seen that both the vapor and the strong solution pass concurrently with each other through the analyzer column in countercurrent flow relation with weak solution and rectifier condensate passing downwardly through the analyzer. As the vapor passes upwardly in the column it becomes cooler and richer in refrigerant due to the mass and heat transfer which takes place in the analyzer.

Heat exchanger 47 in the analyzer has the added advantage that it provides surface for heat and mass transfer to take place between vapor passing upwardly in the analyzer and solution passing downwardly therein. In addition, heat exchanger 47 provides heat transfer between the strong solution and the vapor passing upwardly through the column, as well as the rectifier condensate and weak solution passing downwardly in the column, thus generating additional vapor. The concurrent flow of vapor and strong solution through the system in accordance with this invention assures maximum thermodynamic efficiency with minimum heat transfer surface because vapor which is liberated in the analyzer is always passing to a cooler region where it is being further enriched in refrigerant content.

The vapor then passes through rectifier 35 where it is placed in heat exchange relation with the weak solution passing through coil 36. The heat transfer which takes place in the rectifier results in condensing additional water from the vapor which then leaves the rectifier in a highly purified or enriched state.

The purified refrigerant vapor passes from rectifier 35 through line 58 into the coil of condenser 11. Fan 15 passes air over condenser 11 causing the refrigerant vapor to condense. The condensed refrigerant passes through line 23 and restriction 24 into evaporator 12, as previously explained.

As the vapor passes through rectifier 35, the reflux or solution which is condensed flows by gravity to analyzer 38 and passes downwardly through the analyzer column along with weak solution discharged from outlet 37 of coil 36. This rectifier condensate is heated along with weak solution in the analyzer to produce additional vapor by heat exchange with the strong solution passing through coil 47. By utilizing the heat of the strong solution after it has passed through the generator reservoir 40 but prior to its passage to the solution heat exchanger 36, 45 a gain in cycle efficiency is achieved with minimum over-all heat transfer surface requirements. Consequently, a gain in efficiency is realized by vaporization of ammonia from the rectifier condensate during its passage in heat exchange relation with coil 47. Furthermore, coil 47 adds additional contact surface in analyzer 38 and improves its effectiveness.

It will be seen that by the use of this invention the vapor and the concentrated absorbent solution formed in the generator pass concurrently with each other through the analyzer in countercurrent with the flow of rectifier condensate and weak solution therein. As previously explained, the heat exchange provided in applicant's analyzer results in optimum cycle efficiency with minimum cost and manufacturing complications. Furthermore, the entire flow of weak and strong solution, as well as vapor in the absorption refrigeration machine, flows through applicant's analyzer column without the necessity of providing multiple solution paths by splitting the solution flow. Therefore, optimum cycle efficiency, and minimum heat exchange surface is achieved without the need of complicated piping arrangements or multiple solution path splitting schemes. Furthermore, the construction described readily lends itself to fabrication with a minimum number of joints and pipes, thus reducing both manufacturing costs and locations at which leakage might take place.

While preferred embodiments of this invention have been described for purposes of illustration, it will be appreciated that this invention may otherwise be embodied within the scope of the following claim.

I claim:
An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a rectifier for passing vapor in heat exchange relation with relatively cool weak solution to enrich the refrigerant content of said vapor by condensing absorbent therefrom;
(F) an analyzer for passing vapor from said generator to said rectifier in mass and heat transfer relation with weak absorbent solution to enrich the refrigerant content of said vapor prior to its passage to said rectifier, said analyzer comprising:
 (1) a vertically disposed tubular shell forming a vapor passage,
 (2) a plurality of horizontally disposed vertically spaced plates disposed partially across said shell from alternate sides thereof,
 (3) a helical heat exchange coil disposed in spaces between said plates and said vertically disposed shell, said heat exchange coil being connected to pass strong solution from said generator through said analyzer shell and toward said absorber,
 (4) means to pass vapor from said generator to said analyzer,
 (5) means to pass vapor from said analyzer to said rectifier, and
 (6) means to pass condensate formed in said rectifier to wet the surface of the helical coil in said analyzer to provide heat exchange between strong solution passing through said heat exchanger and said condensate, thereby vaporizing refrigerant from said condensate in said analyzer and effecting mass and heat transfer between condensate wetting the surface of said coil and vapor contacting the wetted surface of said coil.

References Cited by the Examiner
UNITED STATES PATENTS

| | | | |
|---|---|---|---|
| 2,191,551 | 2/1940 | Ullstrand | 62—496 X |
| 2,241,621 | 5/1941 | Shoeld | 62—495 X |
| 3,038,321 | 6/1962 | Merrick | 62—495 |

LLOYD L. KING, *Primary Examiner.*